(12) United States Patent
Sandvik et al.

(10) Patent No.: US 6,832,767 B1
(45) Date of Patent: Dec. 21, 2004

(54) DEVICE FOR CHILD SEAT IN A SHOPPER TROLLEY

(75) Inventors: Dag Harald Sandvik, Finnsnes (NO); Arve Cruickshank, Finnsnes (NO)

(73) Assignee: Fall Stop Holding AS (NO)

( * ) Notice: Subject to any disclaimer, the term of this patent is extended or adjusted under 35 U.S.C. 154(b) by 0 days.

(21) Appl. No.: 10/089,306

(22) PCT Filed: Sep. 28, 2000

(86) PCT No.: PCT/NO00/00319

§ 371 (c)(1),
(2), (4) Date: May 13, 2002

(87) PCT Pub. No.: WO01/23239

PCT Pub. Date: Apr. 5, 2001

(30) Foreign Application Priority Data

Sep. 29, 1999 (NO) .................................. 994728

(51) Int. Cl.[7] .................................................. A47D 1/10
(52) U.S. Cl. ............................. 280/33.993; 297/256.15; 297/256.17; 297/466
(58) Field of Search ............... 280/33.993; 297/256.17, 297/256.15, 423.17, 466

(56) References Cited

U.S. PATENT DOCUMENTS

| | | | | |
|---|---|---|---|---|
| 1,259,604 A | * | 3/1918 | Cook | |
| 2,860,886 A | * | 11/1958 | Schweitzer | |
| 4,280,731 A | * | 7/1981 | Pitts et al. | 297/487 |
| 4,403,807 A | * | 9/1983 | Wilkinson et al. | 297/217 |
| 4,819,988 A | * | 4/1989 | Hellstrom | 297/467 |
| 4,867,464 A | | 9/1989 | Cook | |
| 5,086,960 A | | 2/1992 | Schwietzer | |
| 5,203,612 A | * | 4/1993 | Pokrzywinski | 297/466 |
| 5,203,613 A | * | 4/1993 | Ward | 297/485 |
| 5,547,250 A | * | 8/1996 | Childers | 297/256.17 |
| 5,636,818 A | | 6/1997 | Edwards et al. | |
| 5,651,557 A | | 7/1997 | De Stefano | |

FOREIGN PATENT DOCUMENTS

| | | |
|---|---|---|
| EP | 0133235 | 3/1986 |
| GB | 2282572 | 4/1995 |

* cited by examiner

*Primary Examiner*—Avraham Lemer
(74) *Attorney, Agent, or Firm*—Ostrolenk, Faber, Gerb & Soffen, LLP

(57) ABSTRACT

A safety device in connection with a child seat in a shopper trolley. The safety device prevents a child, placed on the seat (22) from being able to pull its legs out of the openings formed through the end wall (10) of the shopper trolley. The child seat (22) is pivotally suspended from the end wall (10), which can preferably be swung inwards/upwards in the shopper trolley about a horizontal axis, when shopper trolleys are being stacked horizontally. The child seat (22) is placed adjacent to the through opening (14', 14") for the child's legs. At their bottoms and sides the openings are defined by elements (10', 10", 16', 16", 20) included in the end wall (10). To the openings (14', 14") for the child's legals through the end wall (10) there is arranged an above-lying safety element (24), adjustable heightways, which is included in the safety device, and can restrict the openings (14', 14") when being lowered, after the child's legs have been put through the openings (14', 14") and are outside the shopper trolley, to the rear of the end wall (10). The stationary part (28) of the height-adjusting device of the safety element (24) may carry, at its top, an angled or bent plate-like support (52), known in itself, for information/advertisements etc.

10 Claims, 6 Drawing Sheets

DEVICE FOR CHILD SEAT IN A SHOPPER TROLLEY

This invention relates to a device for the child seat in a shopper trolley, where the child seat is pivotally supported in the area of the handle bar of the trolley, so that the openings through the adjacent end piece form passages for the child's legs when the child seat has been pivoted into the trolley, into an approximately horizontal position, the shopper trolley preferably being of the type, which can be inserted partially into other shopper trolleys through an end wall, which can be swung up, to allow stacking in the horizontal direction.

Child seats of the kind in question are not safe, since, by turning itself, the child can easily bring one foot up on the seat, from where it is easy to get up into a standing position, or the child can remain lying on its knees on the seat. Such situations may easily result in the child falling to the floor. Fatal accidents and serious accidents resulting in permanent injuries have happened, caused by falls from the child seat of the shopper trolley.

The passages through the end piece of the shopper trolley nearest to the push handle bar/cross-bar cannot be restricted as such, because this would make it difficult, possibly impossible, to place a child's legs through the openings. Therefore, these permanent passages should be wide and spacious insertion openings, which the child's legs can easily be put through and pulled out of later.

According to the present invention there has therefore been provided a safety device in the form of a transversal body adjustable heightways, which is lowered, when the child's legs have been put through the passage openings of the end piece of the shopper trolley, from an upper idle stand-by position to a lower active securing position, wherein the safety body restricts the passage openings for the child's is legs heightways from the top. When this safety body is in one active lower securing position, this position may correspond to one of a number of different height positions depending on the thickness of the child's thighs. The safety body can thus be adjusted heightways and be fixed at the level set.

According to a particularly advantageous embodiment of the invention, the frame for the support of the safety bar has a plate-like holder at the top, which may be bent into shape from transparent plastic material, for example. In its active position, i.e. when the shopper trolley is not in the stacked position, the upper surface of this plate-like holder element will face the person pushing the shopper trolley, and in a known manner the holder may contain information and/or advertisement and be provided with a clamp for the temporary fastening of a shopping list.

This information carrier may alternatively be directly connected to the inwards/upwards pivotal end wall of the shopper trolley, and may be angled so at its top that its plate-shaped main element (the information-carrying part), sloping downwards/rearwards in the position of use, comes to rest, as the end wall is pivoted inwards/upwards, on or above the transversal handle.

The safety element, which may have a shape resembling a clothes' hanger, which can be adjusted heightways and can be fixed at different levels, may with advantage be secured to a vertically displaceable slide, which can be fixed in different positions of height, and which may have one or more projections or similar engagement means releasably engaging at least one rack oriented vertically, which engagement can be temporarily released when the slide with the safety element is moved upwards or downwards for the purpose of height adjustment. The slide with the safety element and the projection/projections/engagement means are preferably biased towards a position in order to establish and maintain the engagement of the rack(s) in the height position set, preferably by means of a helical spring inserted between the slide and a counter means, which is immovable in the cushioning directions (axial direction) of the spring, but displaceable upwards and downwards in the directions of displacement of the slide, said helical spring extending perpendicularly to the longitudinal direction of the rack(s). By subjecting the slide with the safety element to a pressure force centrally, directed opposite the back-springing direction of the helical spring, and in the axial direction of the spring, the spring is compressed and tightened, while at the same time the one or more protrusions of the slide are disengaged sideways from the respective tooth notch or notches of the rack(s), whereby at least one projection lands in a vertical guide groove.

With the projection of the slide gliding displaceably in the guide groove, the slide with the safety element may be displaced up or down, with the slide in the condition pushed in against the action of the compression spring, until the wanted height position of the safety element is reached.

The effective height position of the safety element will normally depend on the thickness of the child's thighs. When the child is to be removed from the child seat, the slide with the safety element is pressed in against the action of the compression spring, so that said projection is brought out of engagement from a rack notch of the respective rack(s) and lands in the vertical guide groove, in order for the slide with the safety element to be pushed upwards into an idle stand-by position.

Further objects, advantages and features of the invention will appear from the following description of a non-limiting example of a preferred embodiment, which is illustrated in the accompanying drawings, in which.

Figure 5:
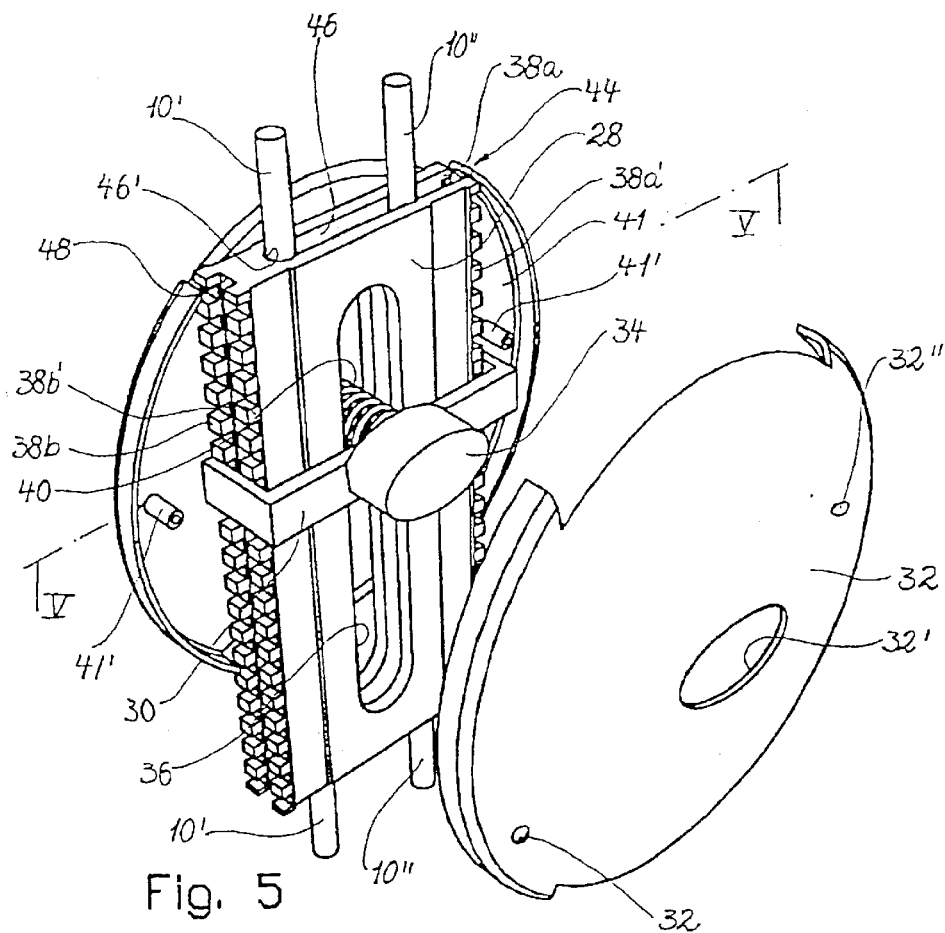
Figure 5A:
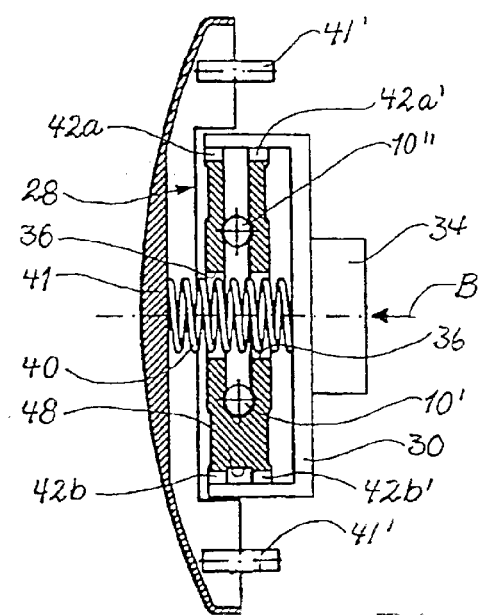
Figure 6:
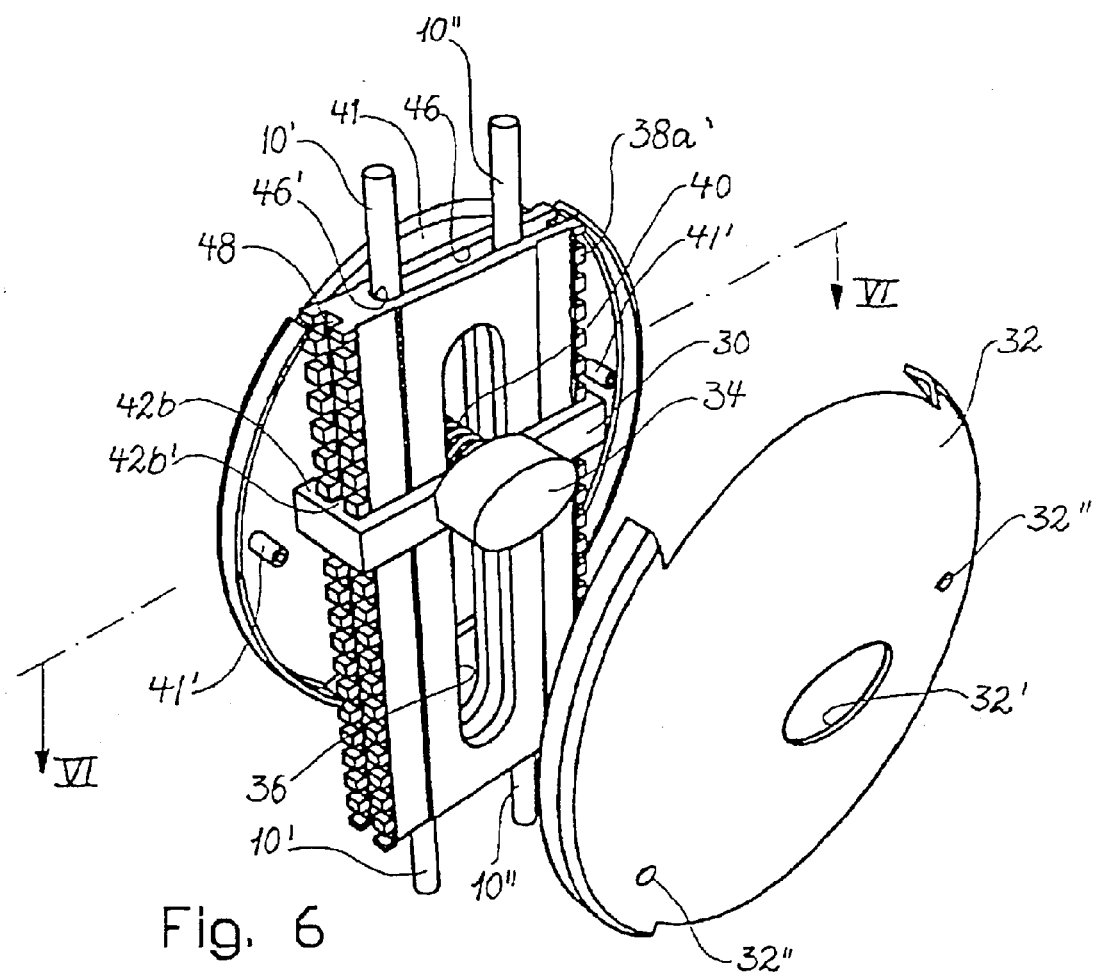
Figure 6A:
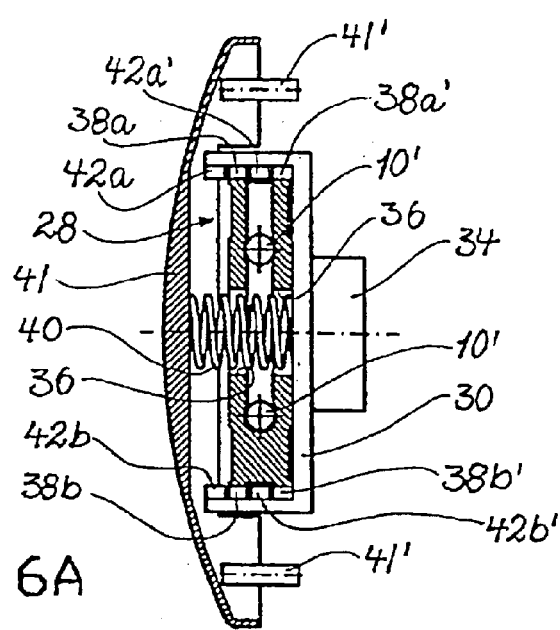

FIGS. 5, 5A and 6, 6A show partial perspective views and illustrate, seen at an angle from above, a simple height-adjusting device for the safety element (not shown), FIG. 5 showing the projections of the slide, carrying the safety element, engaged in stationary vertical racks, which fix the position of the safety element, and have an intermediate guide groove for glidably receiving the projections of the slide carrying the safety element, for the displacement of the safety element heightways;

FIG. 5A being a cross-section along the line V—V in FIG. 5;

FIG. 6 corresponds to FIG. 5 in all essentials, but here the projections of the slide have been disengaged from the notches of the vertical racks, one of the visible projections thereby being positioned in the vertical guide groove located between the two racks forming a pair of racks, in order for the slide to be moved up or down relative to the position shown in FIG. 6; and FIG. 6A is a section along the line VI—VI in FIG. 6.

Figure 1:
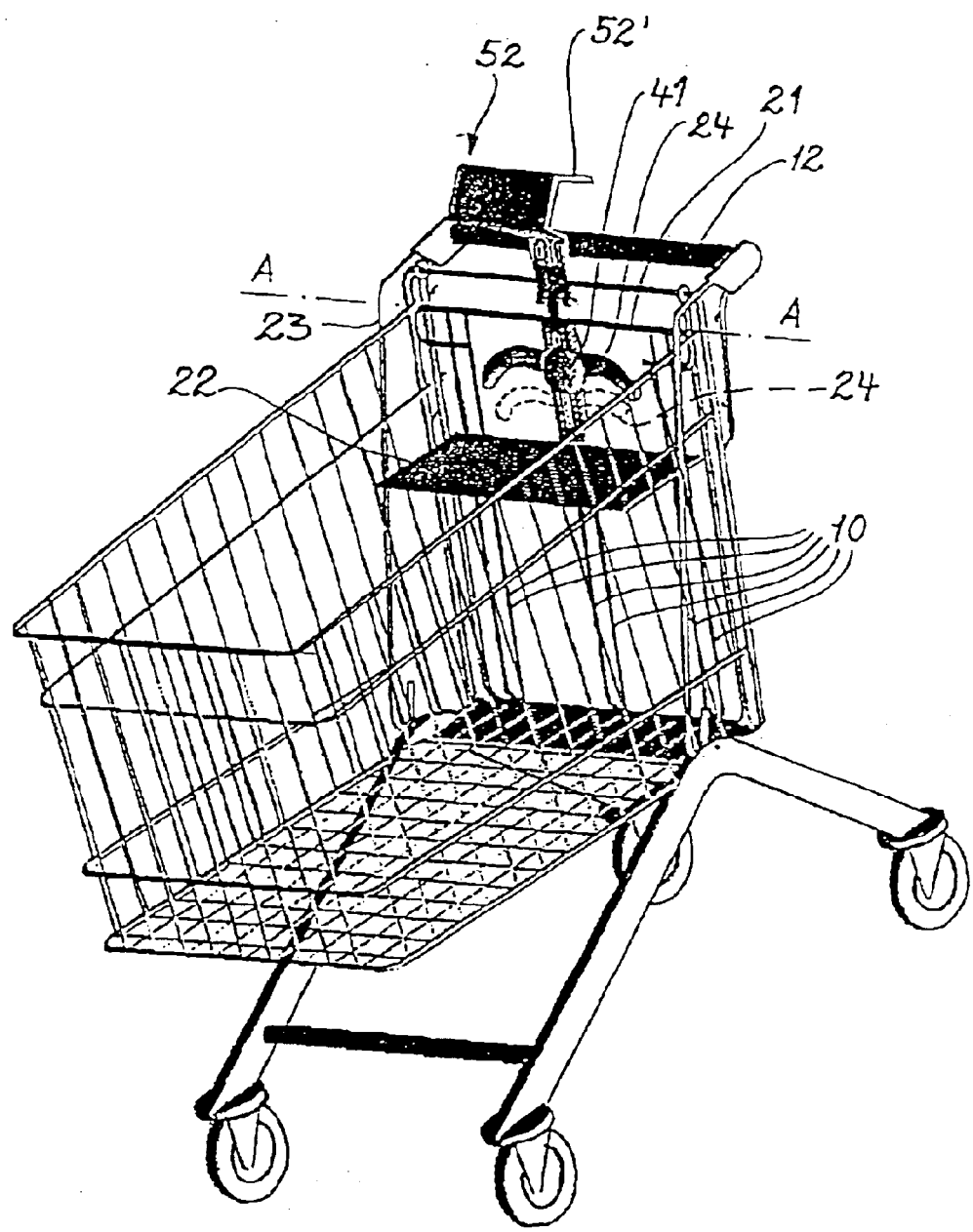
FIG. 1 shows a perspective view of a shopper trolley, in which the safety bar is shown, drawn in full lines, in its upper idle stand-by position, and in dotted lines, in one lower, active position.
Figure 2:
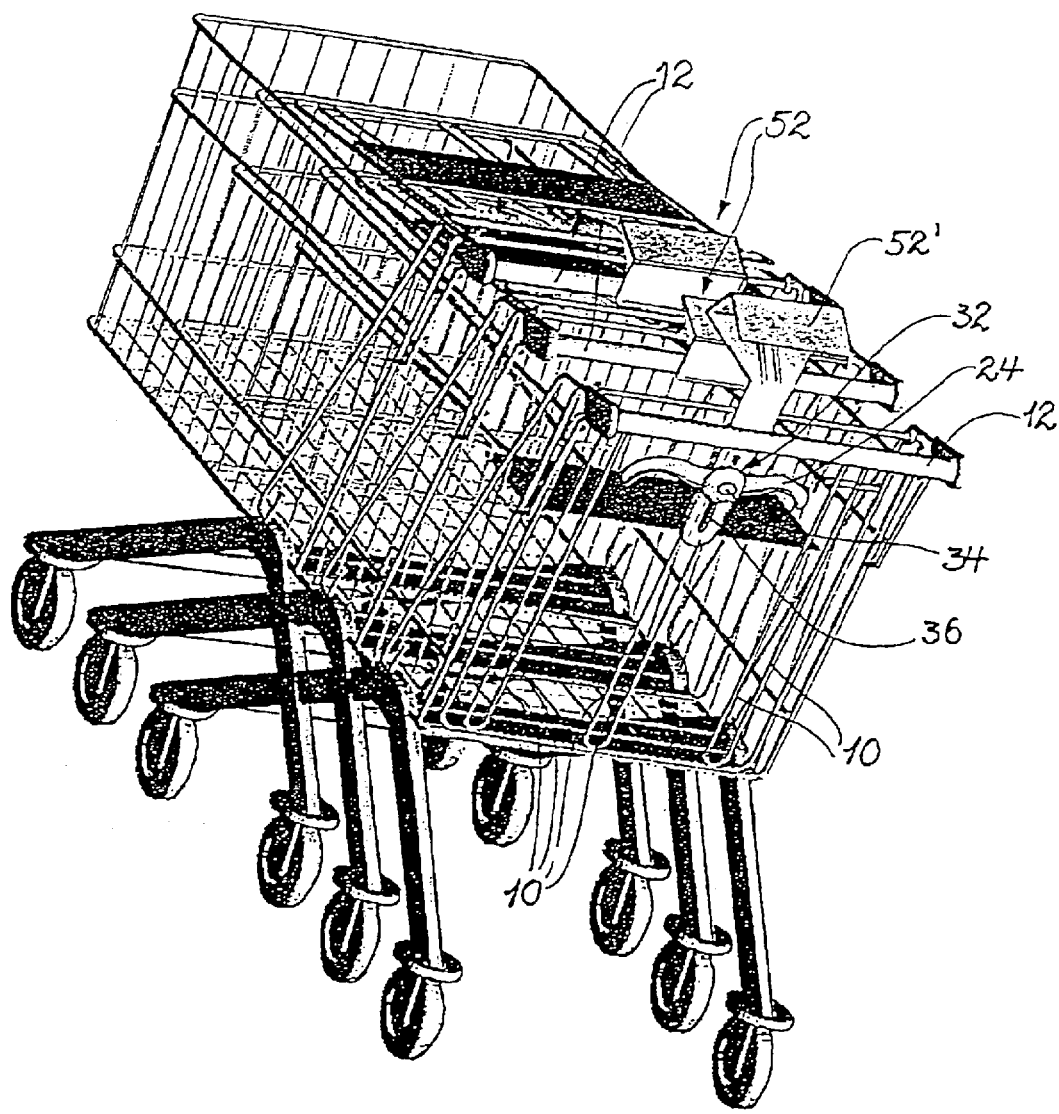
FIG. 2 shows, in perspective, three stackable shopper trolleys, stacked partly into one another in the horizontal direction.
Figure 3:
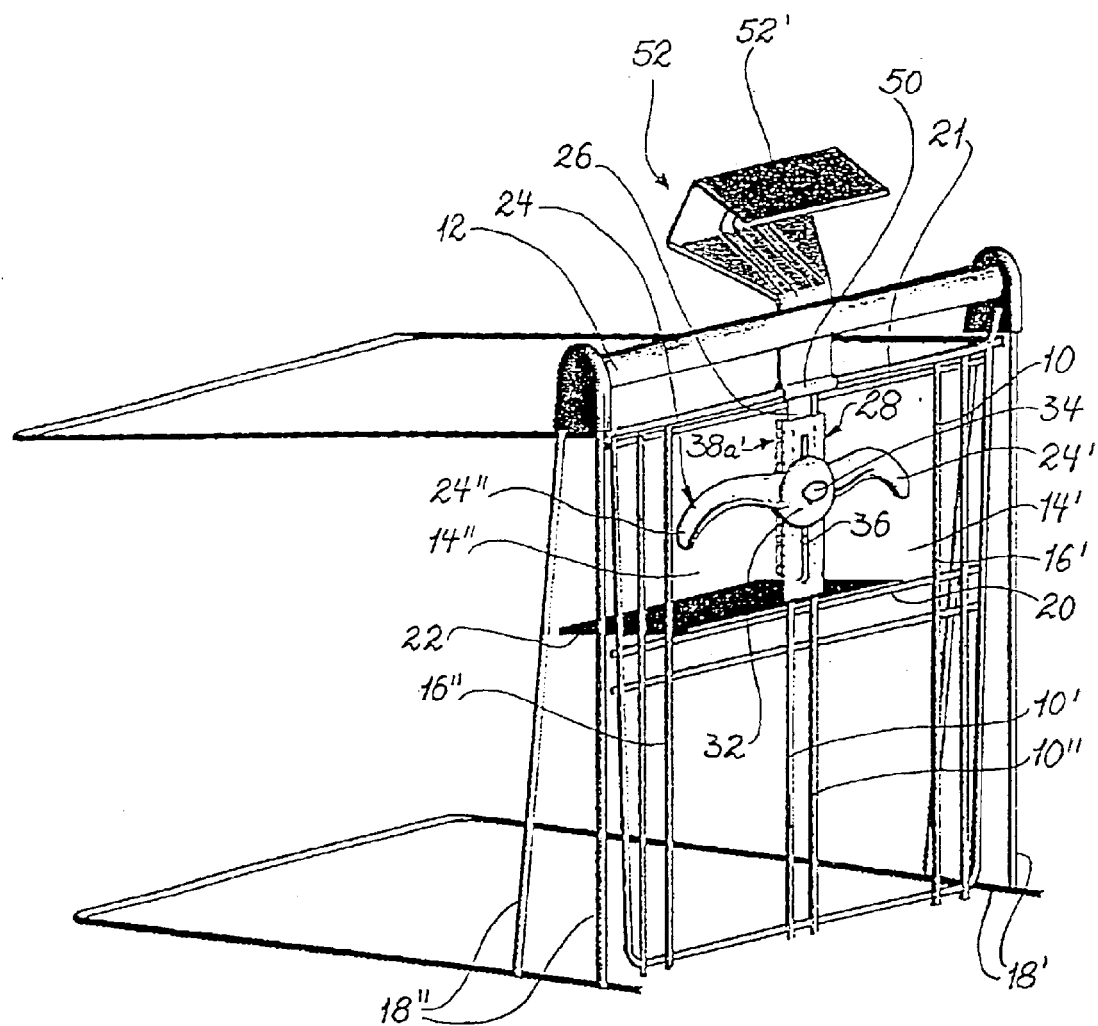
FIG. 3 shows a partial perspective view of a shopper trolley, in which the "basket" of the shopper trolley is highly simplified.

Reference is made to FIGS. 1-3, in which the shopper trolley shown has an end wall 10 at a transversal handle bar 12. As appears more clearly from FIG. 3, the end wall 10 comprises two middle elements 10', 10", essentially vertical, rod-shaped or tubular, each defining, together with an adjacent element 16', 16" parallel therewith, near the side walls of the shopper trolley, represented by elements 18', 18", and a horizontal element 20 included in the end wall 10, a through opening 14' and 14" for the insertion of a child's leg.

In connection with these through insertion openings 14' and 14" for a child's legs, there is pivotally suspended from the end wall 10 and a frame 23 movable relatively thereto, see in particular FIG. 1, a known child seat 22, which has an essentially horizontal position in its active position, as is shown, and an essentially vertical idle position, not shown, when the frame 23 is pivoted to the end wall 10. The pivotal suspension of this child seat 22 is well known and therefore not shown in detail.

At its upper edge, the end wall 10 is pivotally supported on a horizontal axis (suggested through the longitudinal axis A-A of the transversal rod 21 in FIG. 1), so that it may swing up when shopper trolleys are being stacked, inserted partially one into the other horizontally, FIG. 2. By the preceding pivoting of the frame 23 towards the end wall 10, the child seat 22 is pivoted into its idle position parallel to the frame 23 and the end wall 10, so that it does not interfere with the stacking.

Centrally in the upper portion of the end wall in question there is arranged, in accordance with the present invention, a child-securing device 24, which shall cooperate, in principle, in an opening-restricting.manner with the transversal element 20 of the end wall 10 in order to restrict these through openings 14', 14" after the child has put its legs through the openings, and is safely seated on the seat 22.

The active element 24 of the child-securing device is bar shaped and extends essentially parallel with the end wall of the shopper trolley, and has downward end portions 24', 24", each joining the transversal main body at a transition portion rounded convexly upwards/outwards.

The bar-shaped safety element 24 is suspended from the upper portion of the end wall 10, for example from the transversal rod 21.

To the middle rod-shaped/tubular elements 10', 10" of the end wall, the stationary part 28 of the height-adjusting device of the safety element 24 is rigidly secured.

To the top of the frame tubes or similar of the shopper trolley, centrally at the end wall, there is attached, in a manner not shown in further detail, a depending narrow oblong plate 26.

This stationary.part 28 of the height-adjusting device for the safety element 24 cooperates with the vertically displaceable element of the height-adjusting device, which carries the safety element, and which can be fixed in the set, adjusted height, and has the form of a slide 30 in the shape of a right-angled U, viewed horizontally.

The reference numeral 32 identifies a securing head for the safety element 24, 34 identifying an operating knob arranged in a central hole 32' in the securing head 32.

Figure 4:
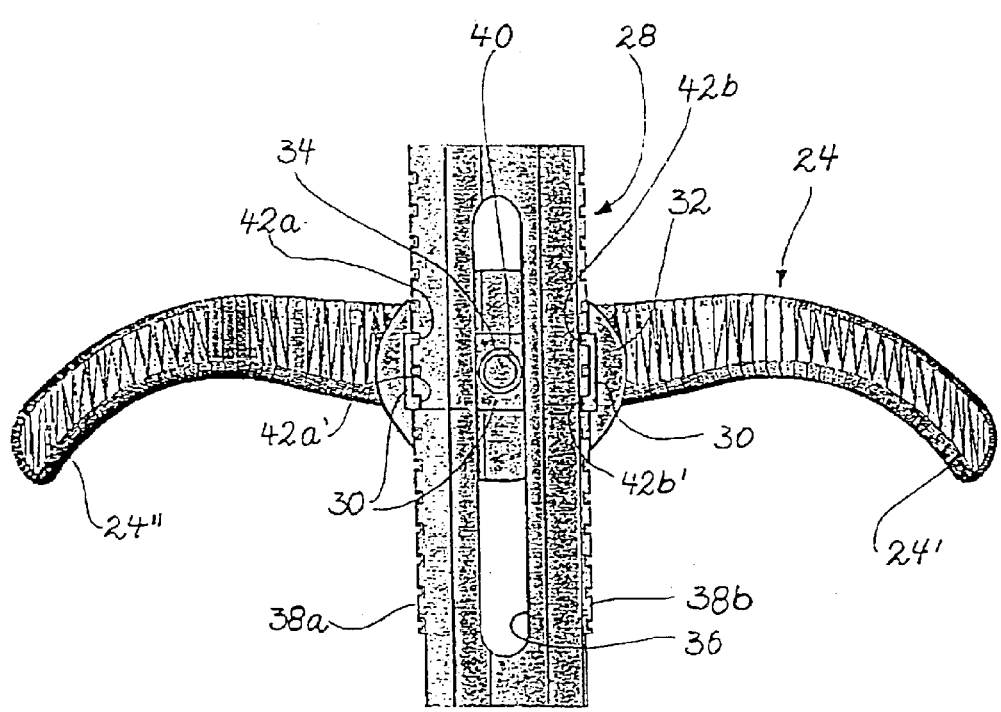
FIG. 4 shows a front view of the safety device separately, the transversal safety element having rounded, downward end portions.

FIG. 4 shows that the stationary part 28 of the height-adjusting device 28, 30 of the safety element has racks 38a, 38b facing in opposite directions. From FIGS. 5, 5A and 6, 6A it appears that each of these racks comprises a pair 38a, 38a' and 38b, 38b' of racks.

The operating knob 34 of the head 32 of the safety element is connected to one end of a compression spring in the form of a helical spring 40 arranged centrally, whose other end is secured centrally in a bowl-shaped slide piece 41 with securing means in the form of two sleeves 41' with internal threads for the reception of screws (not shown), which are screwed into the sleeves 41' through holes 32" in the securing head 32, so that the parts 32 and 41 are immovable perpendicularly to the length of the tubes 10', 10" of the end wall, but can be displaced along said length, so that said bowl-shaped slide piece 41 will form a counter element for the spring 40 by its compression, as a consequence of the pushing in of the operating knob 34.

From FIGS. 4, 5, 5A, 6, 6A it will appear that the slide 30 is provided with four projections 42a, 42a' and 42b, 42b', facing each other in pairs, engaging respective notches of the racks 38a, 38a', 38b, 38b' in the fixed height position of the safety element 24, FIGS. 4 and 5,.

By the pushing in of the operating knob 34 of the safety element 24 in the central hole 32' of the securing head 32 for the compression and tightening of the spring 40, whereby the glide piece 41 of the spring 40 works as a counter element, thereby allowing the compression of the spring 40, the projections 42a, 42a', 42b, 42b' of the slide 30 are brought out of engagement from the notches of the racks 38a, 38a', 38b, 38b', FIGS. 5A, 6 and 6A, whereby the slide piece 41 of the compression spring 40 together with the securing head 32 and the slide 30 can be displaced heightways up or down.

The push-in direction of the operating knob 34 is suggested by B in FIG. 5A. The push-in depth essentially corresponds to the width of one tooth or a projection 42a, 42a', 42b, 42b', which appears from FIGS. 5A and 6A seen together.

According to FIGS. 5 and 6, the part 28 of the height-adjusting and fixing device 28,30 of the safety element 24, which is stationary in the connected position of use, is formed like a U-clamp, i.e. with an elongate cross-section squeezed flat horizontally, which has an insertion opening 44 between the vertical racks 38a, 38a', from where a slot 46 extends vertically through and across most of the horizontal dimension of the part 28, ending in a rounded inner portion 46'. Such a part 28, shaped like a U-clamp, may be slipped over/clamped onto the two middle rod-shaped or tubular elements 10', 10" of the shopper trolley end wall 10, and be secured thereto.

Between the racks 38b and 38b' of the pair 38b,38', of racks, there is formed a vertical guide groove 48 for one projection 42b' of the slide 30, whereas the second projection 42b slides, bearing externally on the rack 38b, when the slide 30 with the safety element 24 is displaced up or down, and the spring 40 is compressed. In their secured position in the position of use, the racks 38a and 38a' of the pair 38a,38a' of racks will enclose a corresponding vertical guide groove formed by the insertion opening 44.

The safety element 24 shaped like a clothes hanger with two arms 24', 24" of a downward concave shape, will essentially come to bear lightly on the child's thighs, so that the child cannot get up when the safety element 24 has been set in the correct position heightways.

The upper end of said upper plate 26 is connected to a support element 50 attached round the upper rod-shaped/tubular element 21 of the end wall 10 of the shopper trolley. The support element 50 carries a so-called information carrier 52 for advertisements etc., whose effective face 52' is oriented in a slope from its top downwards, rearwards, i.e. towards the person pushing the shopper trolley in front of himself/herself, so that he/she can easily see the information, advertisement etc., without having to look away from the child sitting on the seat 22, secured with the safety element 24 across its thighs, FIG. 3.

FIG. 2 shows three shopper trolleys pushed partially into one another, provided with safety elements 24 with height-adjusting and fixing device and information-carrier 52 which are pivoted together with the end wall 10 when this is influenced by another trolley being pushed in.

The plate-shaped main element 52' of the information carrier 52, extending downwards/rearwards from its top, forms a free, outer part of an angled or bent plate body consisting of three or four plate-shaped portions arranged at such angles relative to one another, that when the end wall 10 swings up/in as the shopper trolleys are being stacked in a horizontal row, FIG. 2, the plate-shaped main element 52' of the information-carrier 52, comes from above to rest in front of the transversal handle 12. Such information-carriers 52 can be connected directly or indirectly to the pivotal end wall 10 of the shopper trolley through the safety device.

The invention is not limited to the particular height-adjusting/fixing device shown for the safety bar 24, as other interlockable/releasable, displaceable or telescopic devices may be used, wherein the securing of the individual positions can be stepped or infinitely variable. A safety bar 24, with a spring or a telescopic cylinder arranged thereto, exerting a constant light pressure across the child's thighs, can also be used.

What is claimed is:

1. A device for a child seat in a shopping cart, comprising:
   the child seat being suspended from a hinged side wall operable to pivot into/up in the shopping cart when stacked horizontally;
   the child seat having openings suitable for receiving a child's legs therethrough;
   an over-lying safety element arranged in an area of the openings for restricting the openings when lowered; and
   the safety element being selectively adjustable heightways and releasably fixed in a set height position.

2. The device according to claim 1, wherein the safety element has a shape resembling a clothes hanger consisting of a middle main body essentially transversal, which merges through downward concave intermediate portions into downward end portions.

3. The device according to claim 1, further comprising:
   a plate-like information-carrier connected to the side wall of the shopping cart;
   a main element sloping from the information-carrier top rearwards;
   a plate section sloping forward from the main element and being connected to a carrying section;
   the main element and plate section configured and positioned in such a manner that upon being pivoted as the side wall pivots when two or more shopping carts are stacked into a horizontal row, the main element rests on or above a transversal handle of the shopping cart.

4. The device according to claim 3, further comprising a stationary part coupled to the safety element, the stationary part being connected to the carrying section of the information-carrier.

5. The device according to claim 3, wherein the stationary part further comprises at least an essentially vertical rack coupled to the safety element through a slide or carriage displaceable in a vertical direction between an upper, idle stand-by position, in which the safety element does not restrict said through openings heightways, and several active positions below;
   the slide being formed with at least one projection arranged to engage, in one position of the slide/safety element in a longitudinal direction of the shopping cart, a notch of the rack, whereas in another position of the slide/safety element in the longitudinal direction of the shopping cart projection is pushed sideways out of engagement, whereby the slide/safety element may be freely displaced up or down essentially in a vertical direction.

6. The device according to claim 5, wherein the slide with the safety element is spring-biased towards a non-displaceable position, in which the at least one projection of the slide is engaged in the notch of the rack.

7. The device according to claim 6, further comprising:
   a pair of racks with an intermediate guide groove for the at least one projection of the slide; and
   the slide, the safety element and a spring cooperate to retain the slide in a position conditioned by the at least one projection being engaged in the notch of the rack.

8. The device according to claim 7, wherein the safety element is a U-shaped clamp with a horizontally elongate vertical slot therethrough, which extends over more than half the width of the U-shaped clamp, it being possible for said U-shaped clamp to be passed over/clamped onto end wall elements of the shopping cart.

9. The device according to claim 7, wherein:
   each pair of racks has two parallel projections to be engaged in one rack each; and
   the notches each have a length essentially corresponding to the corresponding width of the intermediate guide groove again corresponding to the distance of displacement of the slide perpendicularly to the longitudinal direction of the racks.

10. The device according to claim 8, wherein:
    each pair of racks has two parallel projections to be engaged in one rack each; and
    the notches each have a length essentially corresponding to the corresponding width of the intermediate guide groove, again corresponding to the distance of displacement of the slide perpendicularly to the longitudinal direction of the racks.

* * * * *